United States Patent
Sherkin et al.

(10) Patent No.: US 10,754,968 B2
(45) Date of Patent: Aug. 25, 2020

(54) PEER-TO-PEER SECURITY PROTOCOL APPARATUS, COMPUTER PROGRAM, AND METHOD

(71) Applicant: DIGITAL 14 LLC, Abu Dhabi (AE)

(72) Inventors: Alexander Sherkin, Vaughan (CA); Ravi Singh, Toronto (CA); Michael Matovsky, Vaughan (CA); Eugene Chin, Oakville (CA)

(73) Assignee: DIGITAL 14 LLC, Abu Dhabi (AE)

( * ) Notice: Subject to any disclaimer, the term of this patent is extended or adjusted under 35 U.S.C. 154(b) by 384 days.

(21) Appl. No.: 15/179,903

(22) Filed: Jun. 10, 2016

(65) Prior Publication Data
US 2017/0357819 A1   Dec. 14, 2017

(51) Int. Cl.
*G06F 21/62* (2013.01)
*H04L 29/06* (2006.01)
*H04L 9/08* (2006.01)

(52) U.S. Cl.
CPC ........ *G06F 21/6218* (2013.01); *H04L 9/0897* (2013.01); *H04L 63/06* (2013.01); *H04L 63/061* (2013.01); *H04L 63/0442* (2013.01); *H04L 63/123* (2013.01); *H04L 63/166* (2013.01); *H04L 2463/062* (2013.01)

(58) Field of Classification Search
None
See application file for complete search history.

(56) References Cited

U.S. PATENT DOCUMENTS

| | | | | |
|---|---|---|---|---|
| 5,577,209 A | * | 11/1996 | Boyle | G06F 21/6218 340/5.74 |
| 5,692,124 A | * | 11/1997 | Holden | H04L 63/0823 707/999.009 |
| 5,828,832 A | * | 10/1998 | Holden | G06F 21/31 709/229 |
| 5,910,987 A | * | 6/1999 | Ginter | G06F 21/10 348/E5.006 |
| 6,154,543 A | * | 11/2000 | Baltzley | G06F 21/00 380/255 |

(Continued)

FOREIGN PATENT DOCUMENTS

| | | |
|---|---|---|
| EP | 1694027 A1 | 8/2006 |
| EP | 2150027 * | 7/2008 |
| EP | 2566126 A1 | 3/2013 |

OTHER PUBLICATIONS

Interntional Search Report and Written Opinion from PCT Application No. PCT/CA2017/000143 dated Sep. 15, 2017.

(Continued)

*Primary Examiner* — Piotr Poltorak
(74) *Attorney, Agent, or Firm* — Zilka-Kotab, P.C.

(57) ABSTRACT

An apparatus, computer program, and method are afforded for providing a peer-to-peer security protocol. In operation, a message is identified that is directed from a first peer device to a second peer device. Further, the message is copied, so that a copy of the message is caused to be sent to an auditing server.

4 Claims, 11 Drawing Sheets

(56) References Cited

U.S. PATENT DOCUMENTS

| | | | | |
|---|---|---|---|---|
| 6,158,007 A * | 12/2000 | Moreh | G06F 21/6227 | 726/1 |
| 6,272,538 B1 * | 8/2001 | Holden | G06F 21/31 | 709/223 |
| 6,272,639 B1 * | 8/2001 | Holden | G06F 21/31 | 713/159 |
| 6,937,726 B1 * | 8/2005 | Wang | H04L 9/0891 | 380/273 |
| 7,073,199 B1 * | 7/2006 | Raley | G06F 21/10 | 380/201 |
| 7,441,277 B2 * | 10/2008 | Burges | G06Q 20/3674 | 713/182 |
| 7,689,563 B1 * | 3/2010 | Jacobson | G06Q 10/107 | 707/663 |
| 8,200,794 B1 * | 6/2012 | Sutherland | H04L 41/046 | 709/222 |
| 8,316,237 B1 * | 11/2012 | Felsher | H04L 9/0825 | 380/282 |
| 9,104,858 B1 * | 8/2015 | Sundaram | G06F 21/6218 | |
| 9,231,923 B1 * | 1/2016 | Cignetti | H04L 63/0428 | |
| 9,235,714 B1 * | 1/2016 | Cignetti | G06F 21/602 | |
| 9,280,677 B1 * | 3/2016 | Perry | G06F 21/6218 | |
| 9,628,516 B2 * | 4/2017 | Pearson | H04L 63/045 | |
| 9,680,808 B2 * | 6/2017 | Cignetti | H04L 63/061 | |
| 9,705,855 B2 * | 7/2017 | Cignetti | H04L 63/061 | |
| 9,760,720 B2 * | 9/2017 | Chapman, III | G06F 21/6218 | |
| 9,781,123 B2 * | 10/2017 | Kim | H04L 67/10 | |
| 10,169,587 B1 * | 1/2019 | Nix | G06F 21/57 | |
| 2001/0032254 A1 * | 10/2001 | Hawkins | G06F 17/3089 | 709/219 |
| 2002/0004902 A1 * | 1/2002 | Toh | H04L 63/0442 | 713/170 |
| 2002/0059144 A1 * | 5/2002 | Meffert | G06F 21/10 | 705/51 |
| 2002/0107875 A1 * | 8/2002 | Seliger | G06F 21/6218 | |
| 2002/0108050 A1 * | 8/2002 | Raley | G06F 21/10 | 713/193 |
| 2002/0129238 A1 * | 9/2002 | Toh | G06F 21/64 | 713/153 |
| 2002/0129261 A1 * | 9/2002 | Cromer | G06Q 20/341 | 713/193 |
| 2002/0160749 A1 * | 10/2002 | Nishikawa | G06F 21/10 | 455/408 |
| 2003/0147536 A1 * | 8/2003 | Andivahis | H04L 63/06 | 380/277 |
| 2003/0177400 A1 * | 9/2003 | Raley | G06F 21/10 | 713/168 |
| 2003/0202663 A1 * | 10/2003 | Hollis | H04L 63/0272 | 380/282 |
| 2005/0100166 A1 * | 5/2005 | Smetters | H04L 63/0492 | 380/277 |
| 2005/0149745 A1 * | 7/2005 | Ishidoshiro | G06F 21/602 | 713/189 |
| 2005/0216531 A1 * | 9/2005 | Blandford | G06F 16/93 | |
| 2005/0278335 A1 * | 12/2005 | Patrick | G06F 21/6227 | |
| 2006/0031351 A1 * | 2/2006 | Marston | H04L 29/06 | 709/206 |
| 2006/0047957 A1 * | 3/2006 | Helms | G06F 21/10 | 713/165 |
| 2006/0048224 A1 * | 3/2006 | Duncan | G06F 21/10 | 726/22 |
| 2006/0117063 A1 * | 6/2006 | Havewala | G06F 21/6218 | |
| 2006/0143462 A1 * | 6/2006 | Jacobs | G06F 21/64 | 713/181 |
| 2006/0212270 A1 * | 9/2006 | Shiu | H04L 63/126 | 702/188 |
| 2006/0230042 A1 * | 10/2006 | Butler | G06F 21/6218 | |
| 2007/0071241 A1 * | 3/2007 | Caprella | H04L 41/28 | 380/270 |
| 2007/0157292 A1 * | 7/2007 | Danner | G06F 21/604 | 726/4 |
| 2007/0162554 A1 * | 7/2007 | Branda | H04L 51/04 | 709/207 |
| 2007/0208857 A1 * | 9/2007 | Danner | G06F 21/6218 | 709/226 |
| 2007/0280483 A1 * | 12/2007 | Fu | H04L 9/0822 | 380/286 |
| 2008/0022088 A1 * | 1/2008 | Fu | H04L 9/0822 | 713/156 |
| 2008/0034415 A1 * | 2/2008 | Chacko | G06F 21/552 | 726/14 |
| 2008/0276086 A9 * | 11/2008 | Proudler | G06F 21/6218 | 713/165 |
| 2009/0092252 A1 * | 4/2009 | Noll | H04L 9/083 | 380/277 |
| 2009/0132813 A1 * | 5/2009 | Schibuk | G06Q 20/223 | 713/158 |
| 2009/0204817 A1 * | 8/2009 | Deana-Roga | H04L 63/0464 | 713/171 |
| 2009/0259512 A1 * | 10/2009 | Larkins | G06F 21/6218 | 726/29 |
| 2009/0327714 A1 * | 12/2009 | Yaghmour | H04L 51/30 | 713/168 |
| 2010/0154043 A1 * | 6/2010 | Castellucci | G06F 21/6218 | 726/7 |
| 2011/0113109 A1 * | 5/2011 | LeVasseur | H04L 51/12 | 709/206 |
| 2011/0231452 A1 * | 9/2011 | Nakajima | G06F 3/0605 | 707/803 |
| 2011/0302415 A1 * | 12/2011 | Ahmad | G06F 21/57 | 713/168 |
| 2011/0321136 A1 * | 12/2011 | Milman | G06F 21/6218 | 726/4 |
| 2012/0070001 A1 * | 3/2012 | Blot-Lefevre | G06F 21/6272 | 380/259 |
| 2012/0124637 A1 * | 5/2012 | Dunaway | G06F 21/00 | 726/1 |
| 2012/0191969 A1 * | 7/2012 | Clifford | G06F 11/1464 | 713/150 |
| 2012/0210134 A1 * | 8/2012 | Mitter | H04L 9/0825 | 713/171 |
| 2013/0138948 A1 * | 5/2013 | Solotorevsky | H04L 12/1403 | 713/153 |
| 2013/0254536 A1 | 9/2013 | Glover | | |
| 2013/0254855 A1 * | 9/2013 | Walters | G06F 21/60 | 726/5 |
| 2014/0044265 A1 * | 2/2014 | Kocher | H04L 9/083 | 380/277 |
| 2014/0064480 A1 * | 3/2014 | Hartley | H04L 9/0866 | 380/30 |
| 2014/0130117 A1 * | 5/2014 | Jeannot | H04L 63/08 | 726/1 |
| 2014/0148952 A1 * | 5/2014 | Paz Lopez | H04L 67/34 | 700/275 |
| 2014/0205092 A1 * | 7/2014 | Hartley | H04L 9/0866 | 380/44 |
| 2014/0208095 A1 * | 7/2014 | Stuntebeck | H04L 63/06 | 713/152 |
| 2015/0200920 A1 * | 7/2015 | Norton | H04L 63/0442 | 713/153 |
| 2016/0036792 A1 * | 2/2016 | Henning | H04L 63/0478 | 713/168 |
| 2016/0112456 A1 * | 4/2016 | Pearson | H04L 63/0442 | 713/170 |
| 2016/0180022 A1 * | 6/2016 | Paixao | G06F 19/322 | 705/3 |
| 2016/0196442 A1 * | 7/2016 | Chapman, III | G06F 21/53 | 726/29 |
| 2017/0070489 A1 * | 3/2017 | Norton | A47L 15/23 | |
| 2017/0083710 A1 * | 3/2017 | Chapman, III | G06F 21/6218 | |
| 2017/0243021 A1 * | 8/2017 | Gupta | G06F 21/6218 | |
| 2017/0272417 A1 * | 9/2017 | Cignetti | H04L 63/061 | |
| 2017/0272944 A1 * | 9/2017 | Link, II | H04W 4/70 | |
| 2017/0331829 A1 * | 11/2017 | Lander | H04L 63/101 | |
| 2017/0344987 A1 * | 11/2017 | Davis | G06Q 20/401 | |

(56) References Cited

U.S. PATENT DOCUMENTS

2017/0357819 A1* 12/2017 Sherkin ............... G06F 21/6218
2017/0357983 A1* 12/2017 Barday ................ G06Q 30/018
2018/0046822 A1*  2/2018 Dunaway .............. G06F 19/322

OTHER PUBLICATIONS

Extended European Search Report from European Application No. 17809485.0, dated Jul. 9, 2019.

* cited by examiner

PEER-TO-PEER SECURITY PROTOCOL APPARATUS, COMPUTER PROGRAM, AND METHOD

FIELD OF THE INVENTION

The present invention relates to security protocols, and more particularly to peer-to-peer security protocols.

BACKGROUND

Modern security communication protocols typically protect data with peer-to-peer cryptographic message protection, and exhibit future secrecy property. Designing a protocol with peer-to-peer cryptographic message protection ensures that there is no security gap in the middle that could become an attractive attack entry point. Future secrecy is also a desirable property for a security protocol that ensures that exchanged messages cannot be compromised even if peer long-term keys are compromised in the future.

However, attempting to add message auditing capabilities into such a system poses a challenge when such peer-to-peer cryptographic message protection is desired, in addition to future secrecy. Specifically, intercepted messages cannot be logged in their original, encrypted form because they cannot be decrypted in the future in accordance with future secrecy. At the same time, decrypting the messages somewhere in the middle also does not provide a viable solution because messages are to be protected peer-to-peer, under peer-to-peer cryptographic message protection.

There is thus a need for addressing these and/or other issues associated with the prior art.

SUMMARY

An apparatus, computer program, and method are afforded for providing a peer-to-peer security protocol. In operation, a message is identified that is directed from a first peer device to a second peer device. Further, the message is copied, so that a copy of the message is caused to be sent to an auditing server.

In a first embodiment, the identifying, the creating, and the causing may be performed by a routing server.

In a second embodiment (which may or may not be combined with the first embodiment), a first public key and a first private key of a first key pair may be received at the auditing server. Further, before being received at the auditing server, the first private key of the first key pair may be encrypted utilizing a second public key of a second key pair (including a second private key and the second public key). Even still, the first private key of the first key pair may be encrypted utilizing a third key pair for obtaining a symmetric key.

As a further option in the context of the present embodiment, the first public key of the first key pair may be accessible by the auditing server. For example, the first public key of the first key pair may be stored by the auditing server in association with a peer identifier that identifies at least one peer device. On the other hand, the second private key of the second key pair may be inaccessible by the auditing server. To this end, the second private key of the second key pair may be stored separate from the auditing server (e.g. in a hardware security module, etc.).

In a third embodiment (which may or may not be combined with the first and/or second embodiments), prior to the message being delivered to the second peer device, the message may be encrypted utilizing the first public key of the first key pair associated with the second peer device. Also prior to the message being delivered to the second peer device, a communication may be initiated with the auditing server. Such communication may include the copy of the message, and such copy of the message may be encrypted by the auditing server, before being stored by the auditing server. Even still, the delivery of the message to the second peer device may be conditioned upon a response to the communication from the auditing server.

In a fourth embodiment (which may or may not be combined with the first, second, and/or third embodiments), the message sent to the second peer device and the copy of the message to be sent to the auditing server, may be identical. Still yet, the copy of the message sent to the auditing server may not be able to be decrypted without a separately stored private key.

DETAILED DESCRIPTION

Figure 1:
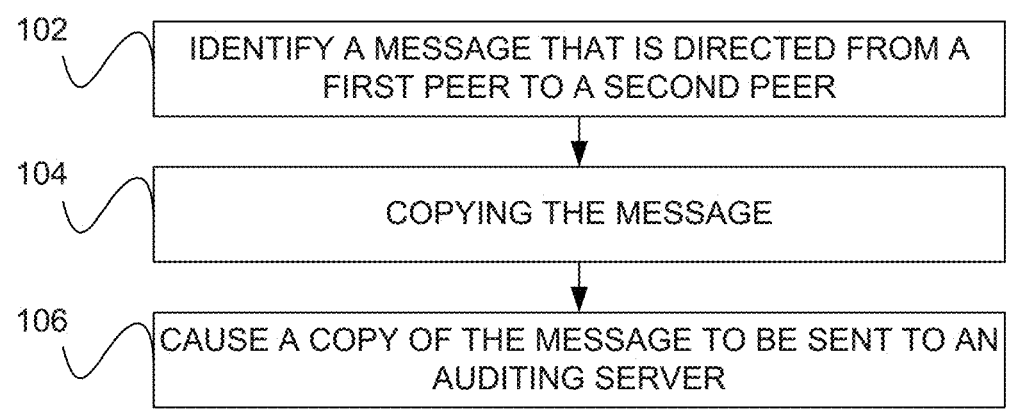
FIG. 1 illustrates a method for a peer-to-peer security protocol, in accordance with one embodiment.

FIG. 1 illustrates a method 100 for a peer-to-peer security protocol, in accordance with one embodiment. In operation 102, a message is identified that is directed from a first peer device to a second peer device. In the context of the present description, the message may include any information (e.g. plaintext, media objects, other objects, etc.) that is capable of being communicated between the peer devices. Further, the peer devices may refer to any devices capable of peer-to-peer communication. Just by way of example, such peer devices may include a phone, a personal data assistant (PDA), a tablet, a laptop, notebook, computer, vehicle, appliance, machine, and/or any other type of device, for that matter.

Further, as indicated in operation 104, the message is copied. Such copying may refer to the creation of another version of the message so that at least one version is capable of being used for auditing purposes. To this end, the copy of the message is caused to be sent to an auditing server, per operation 106. In the present description, the copy of the message caused to be sent to the auditing server may refer to any version of the message that is capable of being used for auditing purposes. For example, such copy of the message may include an original copy (i.e. the message, etc.), a created copy, and/or any copy, for that matter. Further, the copy may or may not be identical to the message. For instance, in one embodiment, a header (and/or any other control layer/portion) of the copy may be slightly different (from that of the message) for messaging purposes, but a plaintext body thereof may or may not remain identical.

Also in the context of the present description, the auditing server may refer to any distributed or non-distributed combination of hardware and/or software that is configured for subsequent auditing of the message. Still yet, the sending of the message copy may be caused directly and/or indirectly in any desired manner.

In one possible embodiment, any one or more of the operations 102-106 may be performed by a routing server. In the context of the present description, the routing server may refer to any distributed or non-distributed combination of hardware and/or software that is configured for routing the message. Of course, in other embodiments, different ones of the operations 102-106 may be carried out by a different system component or even by a number of different system components.

In another possible embodiment, a first public key and a first private key of a first key pair [e.g. data at rest (DAR) key pair, etc.] may be received at the auditing server. As an option, the first key pair may be received in connection with a peer device initialization process that is carried out for all peers. Further, before being received at the auditing server, the first private key of the first key pair may be encrypted utilizing a second public key of a second key pair (e.g. an auditing key pair including a second private key and the second public key, etc.). Still yet, before being received at the auditing server, the first private key of the first key pair may be encrypted utilizing a third key pair (e.g. ephemeral key pair, etc.) for obtaining a symmetric key. It should be strongly noted that the DAR, auditing, ephemeral, etc. key pair examples of the first, second, and third key pairs are set forth for illustrative purposes only and should not be construed as limiting in any manner. As will soon become apparent, the use of such first/second key pairs may contribute to multiple layers of security, in some embodiments.

During use, the first public key of the first key pair may be accessible by the auditing server. For example, the first public key of the first key pair may be stored by the auditing server in association with a peer identifier that identifies at least one peer device. To this end, the first public key of the first key pair may be retrieved (e.g. using the peer identifier, etc.) in connection with sending a message.

In contrast, the second private key of the second key pair may be inaccessible by the auditing server. To this end, the second private key of the second key pair may be stored separate from the auditing server (e.g. in a hardware security module, etc.). As will soon become apparent, such segregation of the second private key of the second key pair may be used to restrict auditing of messages using the auditing server, to prevent malicious infiltration.

Prior to the message being delivered to the second peer device, the message may be encrypted utilizing the first public key of the first key pair (e.g. DAR key pair, etc.) associated with the second peer device. In one embodiment, such encryption may be carried out by the first peer device.

Further, such encryption may further involve an ephemeral key pair for obtaining a symmetric key, as described earlier in the context of encrypting the first private key, during initialization.

Also prior to the message being delivered to the second peer device, an additional security measure may be implemented in the form of a communication initiated with the auditing server. Such communication may include the copy of the message to be delivered to the second peer device, and such copy of the message may be encrypted by the auditing server, before being stored by the auditing server. Even still, the delivery of the message to the second peer device may be conditioned upon receiving a response to the communication from the auditing server.

To this end, the message that is sent to the second peer device and the copy of the message to be sent to the auditing server, may be identical. Still yet, the copy of the message sent to the auditing server may not be able to be decrypted without a separately stored private key. By one or more of such features, future secrecy may be afforded in a secure peer-to-peer protocol environment with secure auditing capabilities.

More illustrative information will now be set forth regarding various optional architectures and uses in which the foregoing method may or may not be implemented, per the desires of the user. It should be noted that the following information is set forth for illustrative purposes and should not be construed as limiting in any manner. Any of the following features may be optionally incorporated with or without the exclusion of other features described.

Figure 2:
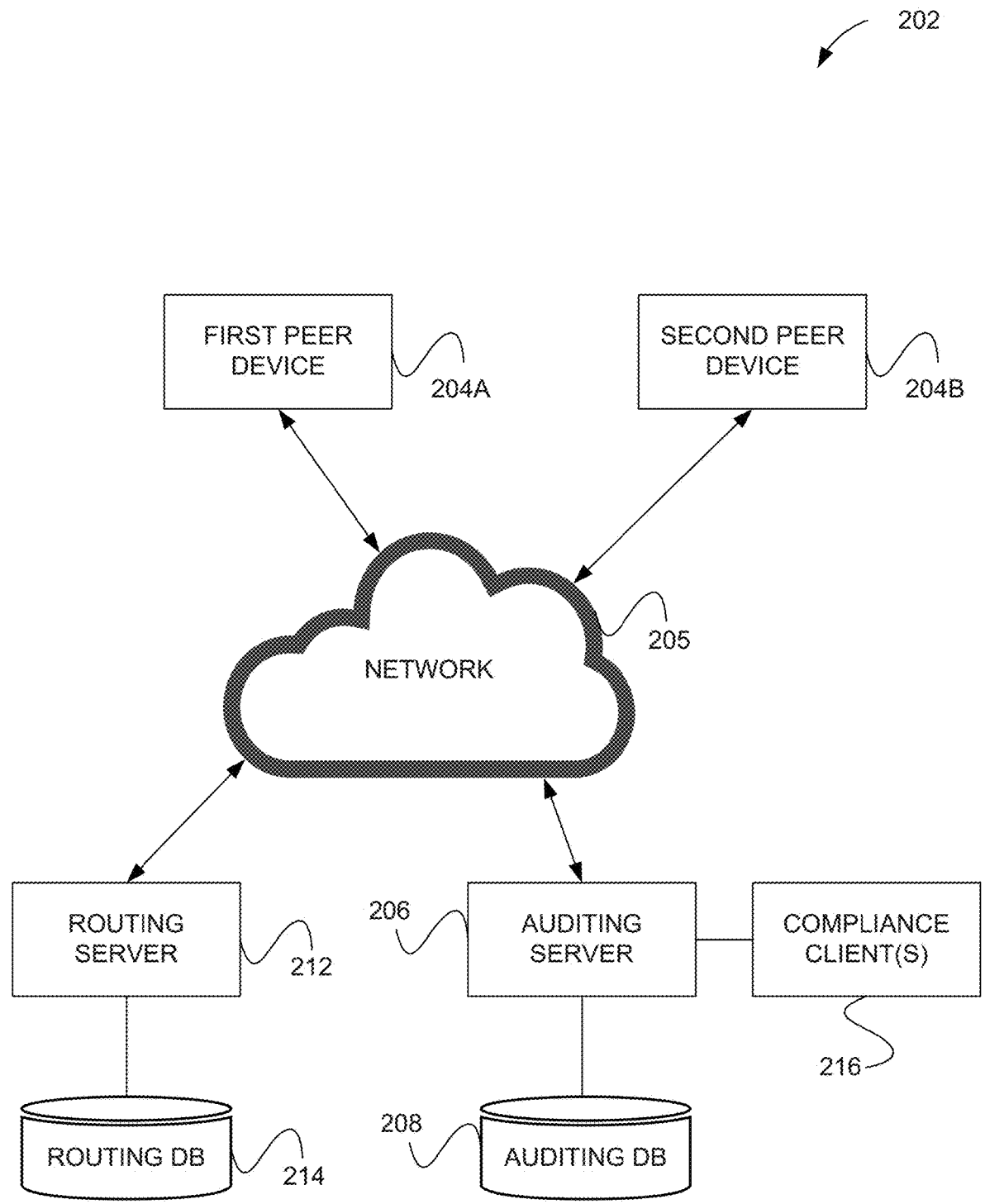
FIG. 2 illustrates a system for auditing messages in the context of a peer-to-peer security protocol, in accordance with one embodiment.

FIG. 2 illustrates a system 200 for auditing messages in the context of a peer-to-peer security protocol, in accordance with one embodiment. As an option, the system 200 may be implemented in the context of any one or more of the embodiments set forth in any previous and/or subsequent figure(s) and/or description thereof. However, it is to be appreciated that the system 200 may be implemented in the context of any desired environment.

As shown, a plurality of peer devices 204A, 204B are provided which are capable of communication over one or more networks 205. In one embodiment, the peer devices 204A, 204B include a first peer device 204A that operates as a sending device and a second peer device 204B that operates as a receiving device. Further, while two peer devices 204A, 204B are illustrated in FIG. 2, it should be noted that any number of the peer devices 204A, 204B may be provided (e.g. one sending peer device and multiple receiving peer devices, etc.). In use, the peer devices 204A, 204B communicate using a peer-to-peer protocol that provides enhanced security.

Further included is an auditing server 206 that is capable of communication with the peer devices 204A, 204B and other components of the system 200 over the one or more networks 205. In use, the auditing server 206 also participates in the aforementioned peer-to-peer protocol, as a peer. Specifically, the auditing server 206 serves for receiving and storing encrypted messages that are communicated between the peer devices 204A, 204B. For example, in use, the first peer device 204A that operates as a sending device copies the auditing server 206 on outgoing messages, for reasons that will soon become apparent. Still yet, the auditing server 206 may verify an authenticity and integrity of the messages upon receipt, prior to storage.

To further support the participation of the auditing server 206 in the peer-to-peer protocol, an auditing database 208 is provided that is capable of communication with the auditing server 206. While such communication is shown to be direct, it should be noted that the auditing database 208 may reside anywhere and may thus be capable of communication with the auditing server 206 via any network (e.g. networks(s) 205, etc.). In still other embodiments, the auditing database 208 may be integrated in the auditing server 206.

In use, the auditing database 208 (and/or the auditing server 206) stores the encrypted messages received by the auditing server 206 for subsequent access. Further, the auditing database 208 (and/or the auditing server 206) stores a plurality of peer identifiers that each uniquely identify the peer devices 204A, 204B in association with various information that is used to support the aforementioned peer-to-peer protocol. More information regarding such peer-specific information will be set forth hereinafter in greater detail.

Still yet, the auditing database 208 (and/or the auditing server 206) further stores an auditing key pair including an auditing public key (e.g. AuditingPublicKey, etc.) and an auditing private key (e.g. AuditingPrivateKey, etc.). In one embodiment, only certified compliance officers may be given access to the auditing private key. For example, the auditing private key may be stored on a hardware security module (HSM), and the compliance officers may be equipped with special keys in order to perform operations using the stored auditing private key.

With continuing reference to FIG. 2, a routing server 212 is provided that is capable of communication with the peer devices 204A, 204B, the auditing server 206, and other components of the system 200 over the one or more networks 205. While the one or more networks 205 (over which the components of the system 200 communicate) are shown to be the same network(s), it should be noted that embodiments are contemplated where the components of the system 200 communicate over one or more different networks.

In use, the routing server 212 serves to propagate messages received from the first peer device 204A operating as the sending device, to the second peer device 204B that operates as the receiving device. Further, the routing server 212 serves to propagate messages received from the first peer device 204A, to the auditing server 206 (as a peer), and any other peer devices (not shown).

To support the operation of the routing server 212, a routing database 214 is provided that is capable of communication with the routing server 212. While such communication is shown to be direct, it should be noted that the routing database 214 may reside anywhere and thus be capable of communication with the routing server 212 via any network (e.g. networks(s) 205, etc.). In still other embodiments, the routing database 214 may be integrated in the routing server 212. In use, the routing database 214 serves to store data (e.g. message queues, authenticated chat group information, encrypted file transfers, presence information, etc.) associated with the peer devices 204A, 204B.

Also included is a compliance client 216 that is capable of communication with the auditing server 206 and/or the auditing database 208. While such communication is shown to be direct, it should be noted that the compliance client 216 may reside anywhere and thus be capable of communication with the auditing server 206 and/or the auditing database 208 via any network (e.g. networks(s) 205, etc.). In still other embodiments, the compliance client 216 may be integrated in the auditing server 206 and/or the auditing database 208.

In operation, the compliance client 216 provides an interface for compliance officer(s) to view messages that are communicated among the peer devices 204A, 204B. To accomplish this, the compliance client 216 may access the messages via the auditing database 208 and decrypt the same using the aforementioned HSM. More information will now be set forth regarding the interoperability of the foregoing components, in accordance with different embodiments.

Figure 3:
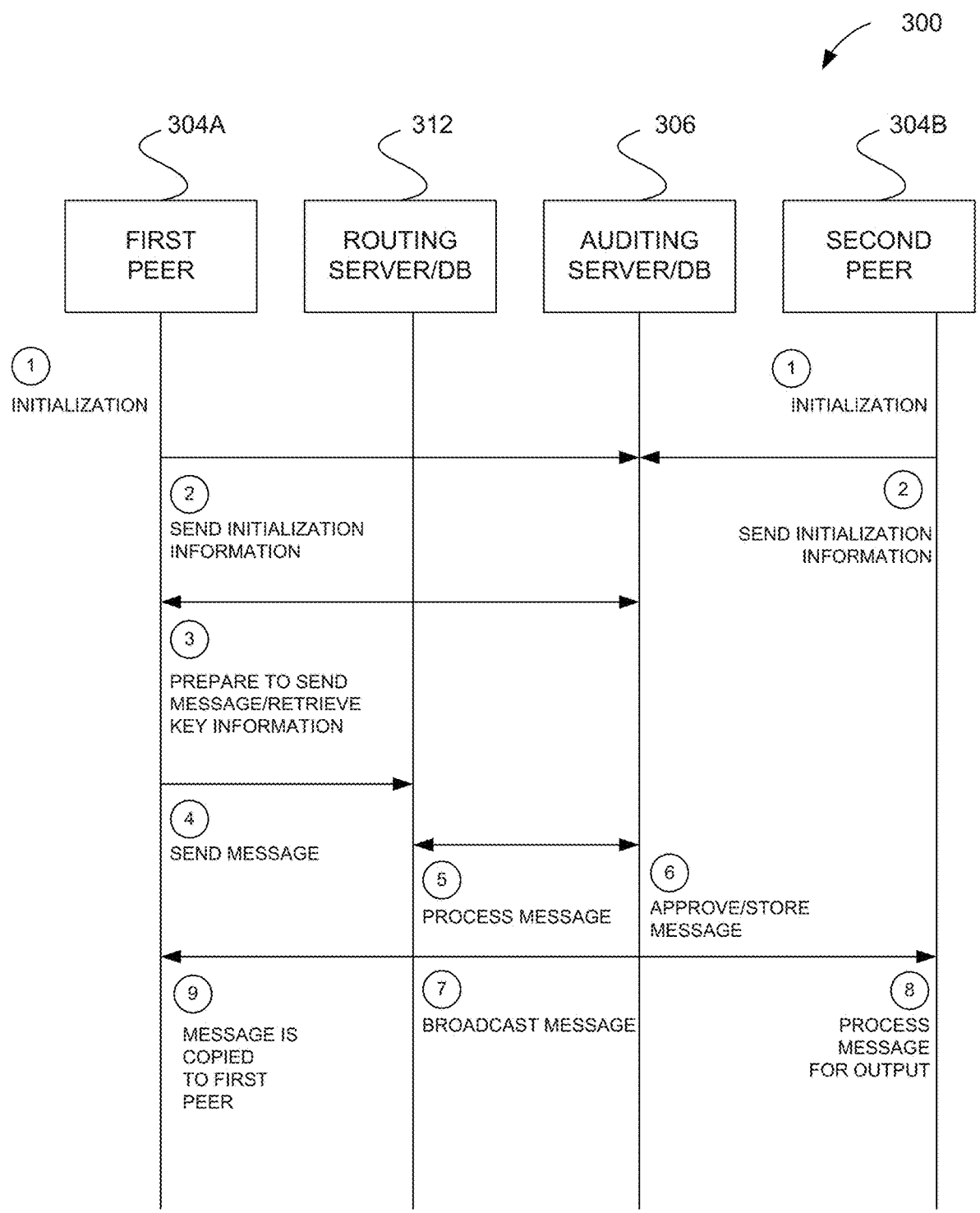
FIG. 3 illustrates a method for auditing messages in the context of a peer-to-peer security protocol, in accordance with one embodiment.

FIG. 3 illustrates a method 300 for auditing messages in the context of a peer-to-peer security protocol, in accordance with one embodiment. As an option, the method 300 may be implemented in the context of any one or more of the embodiments set forth in any previous and/or subsequent figure(s) and/or description thereof. For example, the method 300 may reflect an interoperability among the components of the system 200 of FIG. 2. However, it is to be appreciated that the method 300 may be implemented in the context of any desired environment.

As shown, various interactions take place between a plurality of different components. Such components are shown to include a first peer 304A operating as a sending device (e.g. first peer device 204A of FIG. 2, etc.), a second peer 304B operating as a receiving device (e.g. second peer device 204B of FIG. 2, etc.), an auditing server/database 306 (e.g. the auditing server 206 and/or auditing database 208 of FIG. 2, etc.), and a routing server/database 312 (e.g. routing server 212 and/or routing database 214 of FIG. 2, etc.).

In operation 1, the peers 304A, 304B perform an initialization process that results in initialization information being generated for use in connection with a security peer-to-peer protocol that secures messages communicated between the first peer 304A and the second peer 304B, in a manner that permits secure subsequent auditing of such messages without sacrificing future secrecy. So that such initialization information may be used in such manner, the initialization information is sent from the peers 304A, 304B to the auditing server/database 306, as shown in operation 2.

During use, prior to sending a message by the first peer 304A, the first peer 304A prepares to send such message by retrieving key information from the auditing server/database 306 and further prepares such message by encrypting the same, as shown in operation 3. To this end, the encrypted message to be broadcasted may be created and then sent to the routing server/database 312. See operation 4.

Next, in operation 5, the routing server/database 312 processes the encrypted message received in operation 4, by sending the same to the auditing server/database 306 so that the auditing server/database 306 has an opportunity to approve of the encrypted message broadcast and store an encrypted message copy. See operation 6. Upon receipt of approval, the routing server/database 312 broadcasts the encrypted message to all peers, including the second peer 304B operating as the receiving device. See operation 7.

To this end, the encrypted message is received by the second peer 304B operating as the receiving device, for being decrypted such that plaintext of the message may be output. See operation 8. More information will now be set forth regarding various details of the foregoing operations, in accordance with different embodiments.

Figure 4:
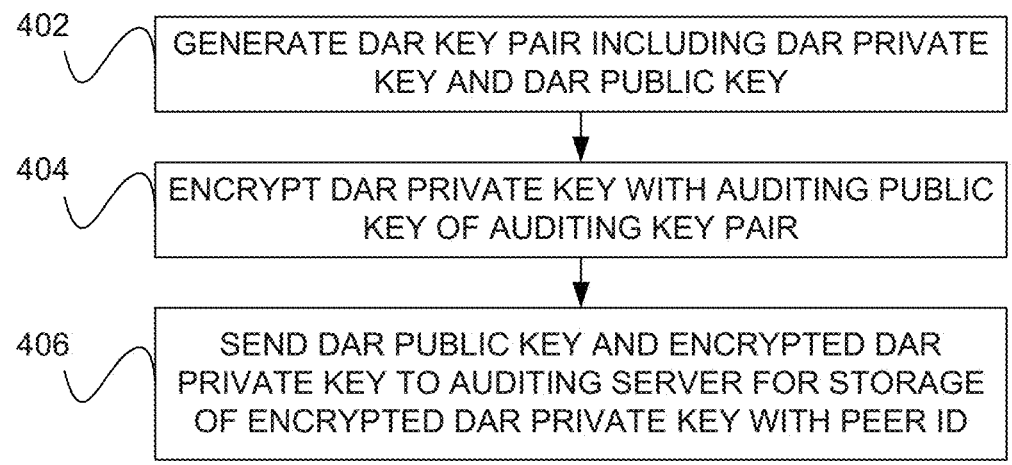
FIG. 4 illustrates a method for initializing a peer device prior to message broadcast, in accordance with one embodiment.

FIG. 4 illustrates a method 400 for initializing a peer device prior to message broadcast, in accordance with one embodiment. As an option, the method 400 may be implemented in the context of any one or more of the embodiments set forth in any previous and/or subsequent figure(s) and/or description thereof. For example, the method 400 may reflect various steps of operations 1/2 of the method 300 of FIG. 3. However, it is to be appreciated that the method 400 may be implemented in the context of any desired environment.

As shown, a first peer device (e.g. first peer device 204A of FIG. 2, first peer device 304A of FIG. 3, etc.) generates a data at rest (DAR) key pair including a DAR public key and a DAR private key (e.g. DARPublicKey, DARPrivateKey, etc.). See operation 402. Still yet, the first peer device encrypts the DAR private key with an auditing public key (e.g. AuditingPublicKey, etc.) to generate an encrypted DAR private key [e.g. $E_{AuditingPublicKey}$(DARPrivateKey), etc.). Note operation 404.

As mentioned earlier, the auditing public key may be stored/provided by an auditing server (e.g. auditing server 206 and/or auditing database 208 of FIG. 2, auditing server/database 306 of FIG. 3, etc.). Further, in various embodiments, the foregoing encryption may be achieved by using the auditing public key with an ephemeral key pair using a key agreement algorithm (e.g. Diffie-Hellman, etc.) to obtain a symmetric key that protects the key data. Thus, the auditing public key, along with an ephemeral public key may participate in a cryptographic key agreement scheme (e.g. Diffie-Hellman, etc.) to obtain the symmetric key that will be used to encrypt messages. Alternatively, the auditing public key may be used to encrypt a randomly generated symmetric key using an asymmetric encryption scheme such as RSA. In one embodiment, Diffie-Hellman may be used if elliptic curve crypto (ECC) is used (since it is not possible to encrypt a symmetric key directly with a public key in ECC).

Data integrity may be further protected by a media access control (MAC) key on the cipher text. Such MAC key may be derived from the symmetric key (obtained from a key exchange).

As indicated in operation 406, the first peer device sends the DAR public key and the encrypted DAR private key to the auditing server. As an option, communication with the auditing server may be protected with transport layer security (TLS) and/or any other desired protocol. By this design, the auditing server may store the encrypted DAR private key in association with a peer identifier, for subsequent retrieval using the peer identifier.

Figure 5:
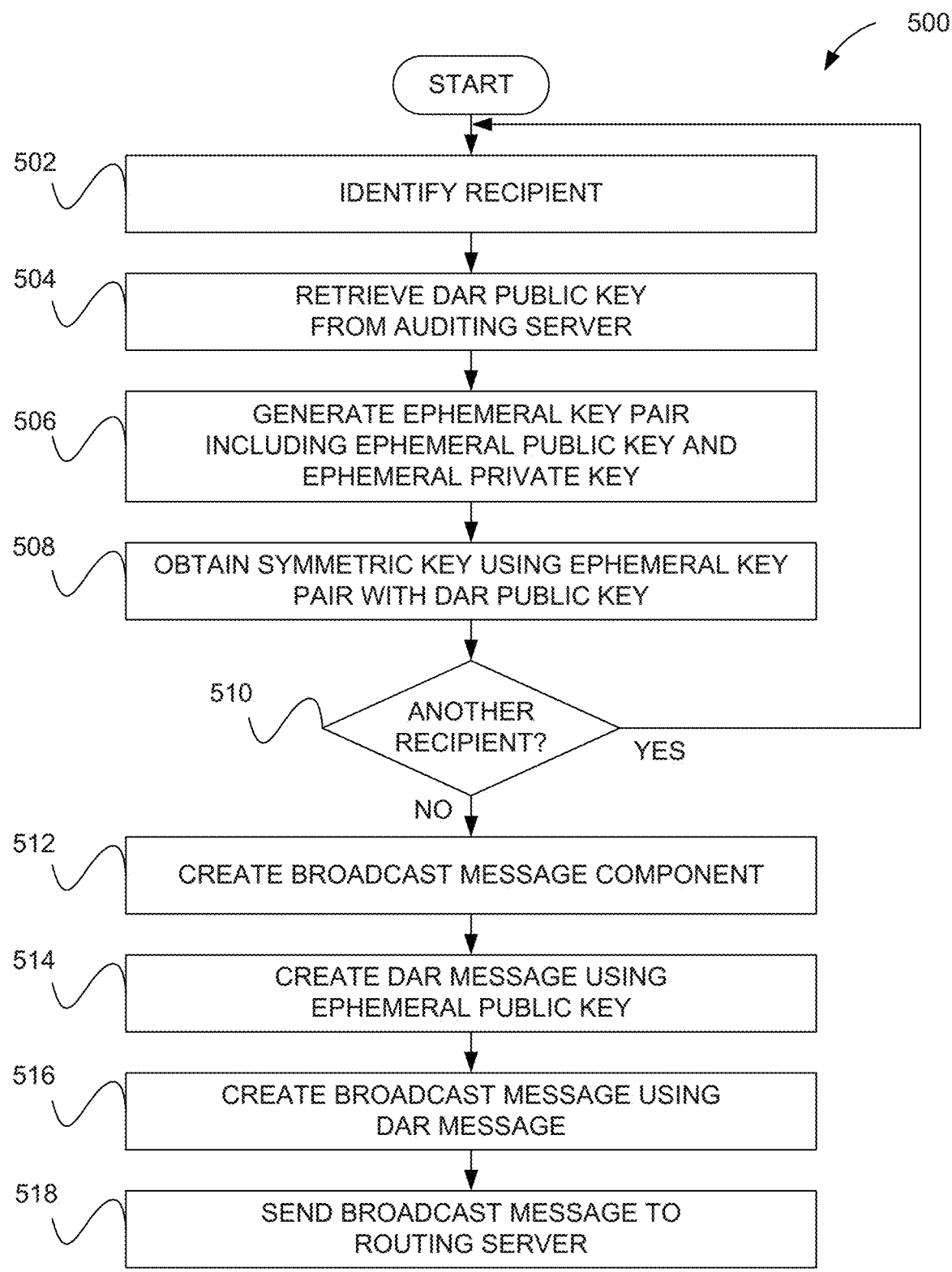
FIG. 5 illustrates a method for preparing a message and sending the same, in accordance with one embodiment.

FIG. 5 illustrates a method 500 for preparing a message and sending the same, in accordance with one embodiment. As an option, the method 500 may be implemented in the context of any one or more of the embodiments set forth in any previous and/or subsequent figure(s) and/or description thereof. For example, the method 500 may reflect various steps of operations 3/4 of the method 300 of FIG. 3, and/or may follow the method 400 of FIG. 4. However, it is to be appreciated that the method 500 may be implemented in the context of any desired environment.

As shown, the method 500 is performed by a first peer device (e.g. first peer device 204A of FIG. 2, the first peer device 304A of FIG. 3, etc.), and at least a portion of such method 500 is iterated for each recipient peer device (e.g. second peer device 204B of FIG. 1, the second peer device 304B of FIG. 3, etc.), but excluding an auditing server (e.g. auditing server 206 and/or auditing database 208 of FIG. 2, auditing server/database 306 of FIG. 3, etc.).

Specifically, the first peer device operating as the sending device identifies each recipient peer device in operation 502, for the purpose of fetching a recipient peer device DAR public key [e.g. DARPublicKey(RecipientPeerID), etc.] from the auditing server. See operation 504. While the auditing server may be treated as a peer device (for the purpose of broadcasting encrypted messages), such auditing server does not necessarily have a corresponding DAR public key, because the auditing server (when operating as a peer) does not necessarily need to be audited (but may, in some embodiments).

As indicated in operation 506, the first peer device generates an ephemeral key pair including an ephemeral public key (e.g. EphemeralPublicKey, etc.) and an ephemeral public key (e.g. EphemeralPrivateKey, etc.). Further, the first peer device uses the ephemeral key pair together with the aforementioned DAR public key [e.g. DARPublicKey(RecipientPeerID), etc.] to obtain a symmetric key [e.g. SymmetricKey(RecipientPeerID), etc.] using a key agreement algorithm (e.g. Diffie-Hellman, etc.) that may or may not be similar to the key agreement algorithm set forth earlier. See operation 508. As indicated by decision 510, operations 502-508 are repeated for each recipient peer device.

At this point, the first peer device has a symmetric key for each recipient. The first peer device may thus use the symmetric keys to create a DAR broadcast message component (e.g. DataAtRestBroadcastPart, etc.) using a secure message broadcast protocol. See operation 512. Equation #1 illustrates one exemplary secure message broadcast protocol:

$$\text{DataAtRestBroadcastPart=BroadcastProtocol}(\{\text{SymmetricKey[RecipientPeerID]}\})) \quad \text{Equation \#1}$$

In one embodiment, the secure message broadcast protocol may involve a sender generating a broadcast symmetric key and encrypting the message using the broadcast symmetric key. The broadcast symmetric key could be encrypted using the recipient's symmetric key (described earlier) for every recipient. Each recipient may receive the encrypted broadcast key, decrypt the encrypted broadcast key using the recipient symmetric key, and then use the broadcast key to decrypt the message. A MAC key could be generated for each recipient from the symmetric key (described earlier) to protect message authenticity and integrity.

Next, in operation 514, a DAR message is created using the ephemeral public key (e.g. EphemeralPublicKey, etc.). Specifically, the first peer device adds the ephemeral public key to the DAR broadcast message component (e.g. DataAtRestBroadcastPart, etc.) to create the DAR message, in accordance with Equation #2 below. In one embodiment, the ephemeral public key may be obtained using a recipient peer identifier which has an associated the ephemeral public key.

$$\text{DataAtRestMessage}=\{\text{EphemeralPublicKey[RecipientPeerID]}\},\text{DataAtRestBroadcastPart}. \quad \text{Equation \#2}$$

Next, in operation 516, the first peer device creates a peer-to-peer broadcast message by wrapping the DAR message with the peer-to-peer security protocol. It should be noted that a routing server (e.g. routing server/database 312 of FIG. 3 and/or routing server 212, routing database 214 of FIG. 2, etc.) is one of the peer recipients. To this end, the wrapped DAR message is sent to the routing server, as indicated in operation 518. As an option, secure broadcasting may be used to ensure that the same peer-to-peer message is sent to all recipients, including the routing server.

Figure 6:
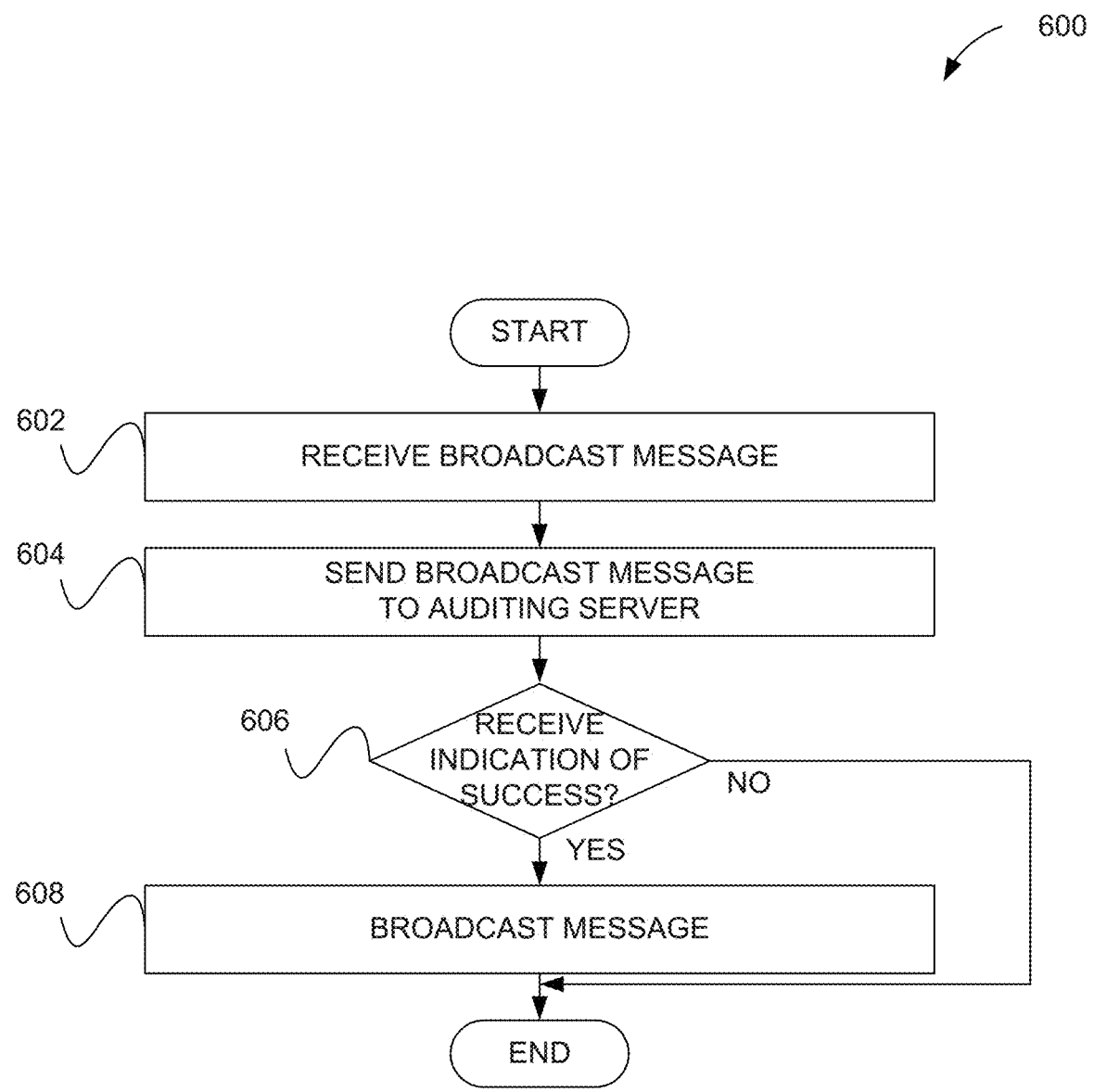
FIG. 6 illustrates a method for processing a received encrypted message utilizing a routing server, in accordance with one embodiment.

FIG. 6 illustrates a method 600 for processing a received encrypted message utilizing a routing server, in accordance with one embodiment. As an option, the method 600 may be implemented in the context of any one or more of the embodiments set forth in any previous and/or subsequent figure(s) and/or description thereof. For example, the method 600 may reflect various steps of operations 5/6 of the method 300 of FIG. 3, and/or may follow the method 500 of FIG. 5. However, it is to be appreciated that the method 600 may be implemented in the context of any desired environment.

As indicated in operation 602, an encrypted broadcast message is received at a routing server (e.g. routing server/database 312 of FIG. 3, routing server 212 and/or routing database 214 of FIG. 2, etc.) from a first peer device operating as a sending peer device (e.g. first peer device 204A of FIG. 2, first peer device 304A of FIG. 3, etc.). In response, the routing server sends the encrypted broadcast message to an auditing server (e.g. auditing server 206 and/or auditing database 208 of FIG. 2, auditing server/database 306 of FIG. 3, etc.).

The routing server then polls until receipt of an indication of success in decision 606. In one embodiment, such indication of success may be condition upon the auditing server. Specifically, the auditing server may ensure that the broadcast message contains a message copy for the auditing server. For example, if the message is encrypted by a peer-to-peer layer, the auditing server is a recipient in the peer-to-peer layer and can decrypt the peer-to-peer layer encryption. The auditing server may also verify a digital signature on the message. The auditing server may also check if it has encrypted DAR public keys for all listed recipients. Upon receipt of the indication of success per decision 606, the encrypted message is broadcasted to all peers (e.g. the second peer device 204B of FIG. 1, the second peer device 304B of FIG. 3, etc.). See operation 608. As shown, the first peer device may also be a designated recipient of such broadcast.

Figure 7:
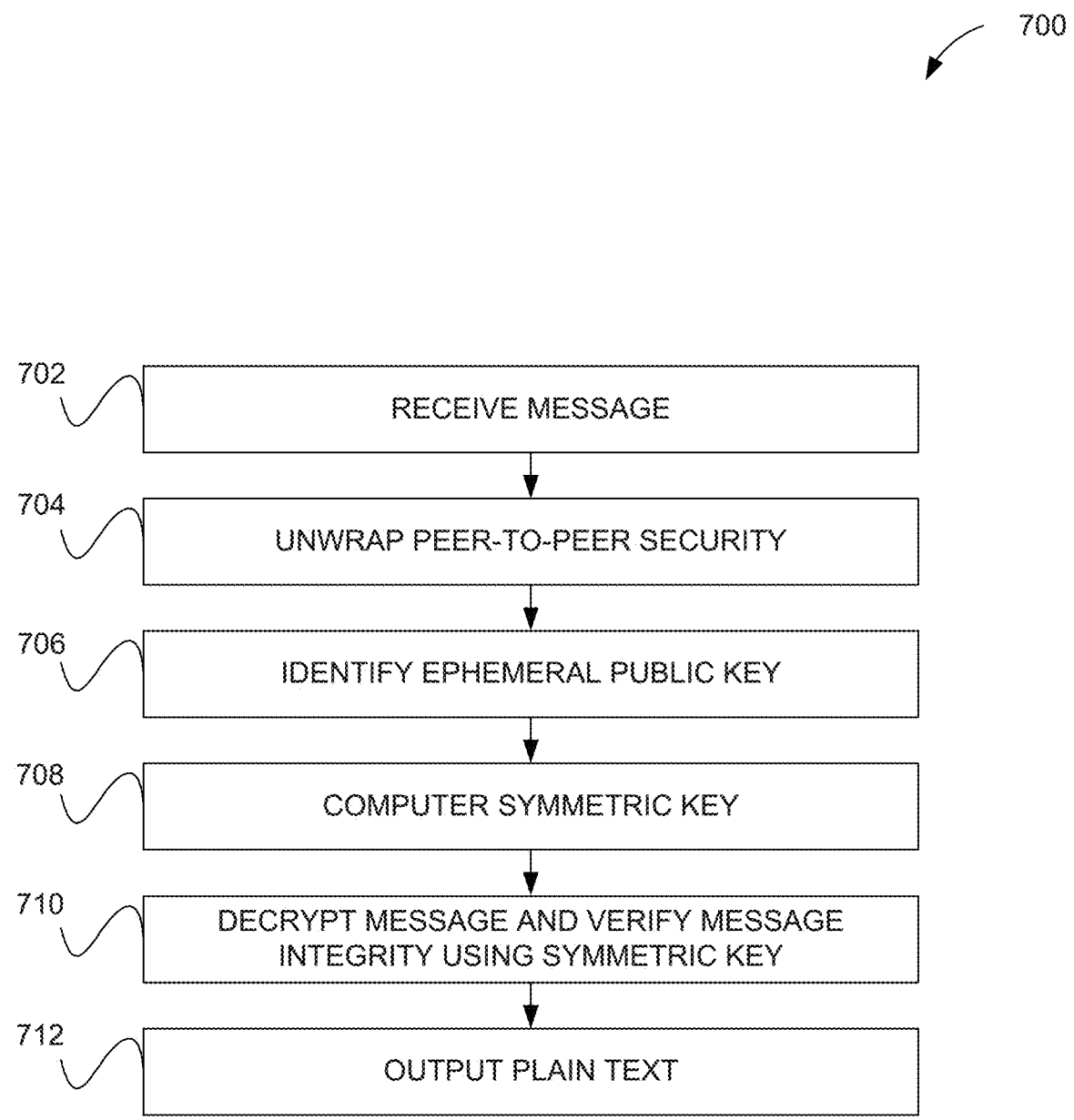
FIG. 7 illustrates a method for processing a broadcasted encrypted message received at a recipient peer device, in accordance with one embodiment.

FIG. 7 illustrates a method 700 for processing a broadcasted encrypted message received at a recipient peer device, in accordance with one embodiment. As an option, the method 700 may be implemented in the context of any one or more of the embodiments set forth in any previous and/or subsequent figure(s) and/or description thereof. For example, the method 700 may reflect various steps of operation 8 of the method 300 of FIG. 3, and/or may follow the method 600 of FIG. 6. However, it is to be appreciated that the method 700 may be implemented in the context of any desired environment.

As shown, in operation 702, an encrypted broadcast message is received by a second peer device operating as a receiving peer device (e.g. second peer device 204B of FIG. 1, the second peer device 304B of FIG. 3, etc.). Upon receipt, the second peer device unwraps the peer-to-peer security in operation 704.

Next, the second peer device locates the ephemeral public key that matches a recipient identifier (e.g. RecipientID, etc.) of the second peer device. See operation 706. Thereafter, in operation 708, the second peer device computes the symmetric key using its DAR private key (e.g. DARPrivateKey, etc.) and the ephemeral public key. The second peer device then inputs the symmetric key into the broadcast protocol to decrypt the message and verify message integrity. See operation 710. The second peer device may then have access to the message (e.g. plaintext, etc.), which is output for providing access thereto. See operation 712.

Figure 8:
FIG. 8 illustrates a method for storing a broadcasted encrypted message received at an auditing server, in accordance with one embodiment.

FIG. 8 illustrates a method 800 for storing a broadcasted encrypted message received at an auditing server, in accordance with one embodiment. As an option, the method 800 may be implemented in the context of any one or more of the embodiments set forth in any previous and/or subsequent figure(s) and/or description thereof. For example, the method 800 may reflect various steps of operation 6 of the method 300 of FIG. 3, and/or may coincide with the method 700 of FIG. 7. However, it is to be appreciated that the method 800 may be implemented in the context of any desired environment.

As shown, the encrypted broadcast message is received by an auditing server (e.g. auditing server 206 and/or auditing database 208 of FIG. 2, auditing server/database 306 of FIG. 3, etc.). Upon receipt, the auditing server unwraps the peer-to-peer security in operation 803 (similar to that in operation 704 of FIG. 7).

Next, in operation 804, the auditing server encrypts the message M with its auditing public key (e.g. AuditingPublicKey, etc.) to get $E_{AuditingPublicKey}(M)$. Such encryption may be achieved by using the auditing public key (e.g. AuditingPublicKey, etc.) with an ephemeral key pair with a key agreement algorithm (e.g. Diffie-Hellman, etc.) to obtain a symmetric key that protects the message. Data integrity may be further protected by a media access control (MAC) key on the cipher text. Such MAC key may be derived from the symmetric key (obtained from a key exchange).

To this end, the auditing server stores the encrypted message in an associated database along with any necessary metadata including, but not limited to sender, recipients, timestamp, etc. See operation 806. It should be noted that the auditing server cannot necessarily, by itself, decrypt the message since it does not have access to the auditing private key (e.g. AuditingPrivateKey, etc.). It is also worth noting that the message plaintext is not available to the auditing server as a result of the method 800, since such requires a compliance client for which additional information will now be set forth.

Figure 9:
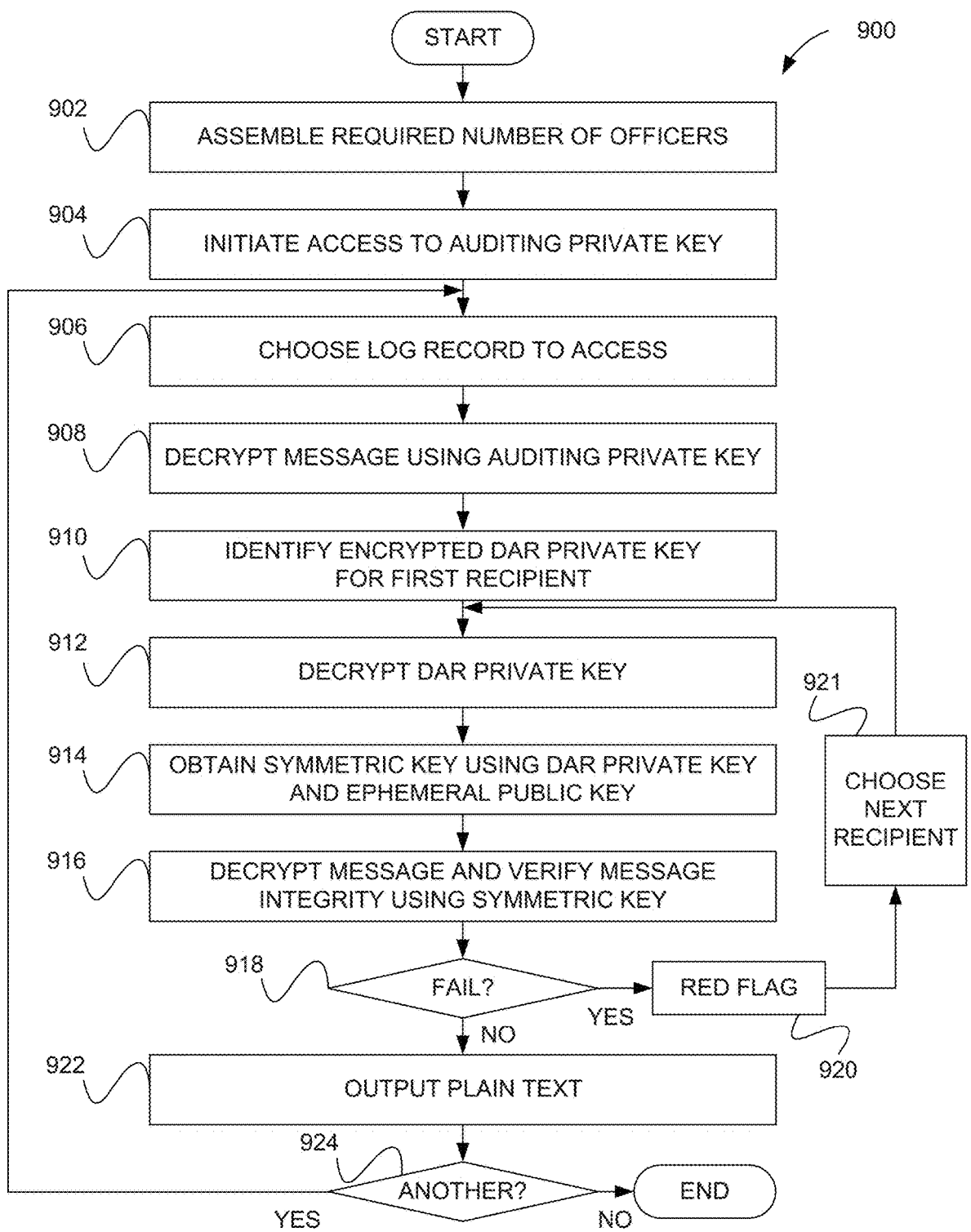
FIG. 9 illustrates a method for accessing logged encrypted messages on an auditing server utilizing a compliance client, in accordance with one embodiment.

FIG. 9 illustrates a method 900 for accessing logged encrypted messages on an auditing server utilizing a compliance client, in accordance with one embodiment. As an option, the method 900 may be implemented in the context of any one or more of the embodiments set forth in any previous and/or subsequent figure(s) and/or description thereof. However, it is to be appreciated that the method 900 may be implemented in the context of any desired environment.

The method 900 is initiated when access is desired to one or more encrypted messages stored by an auditing server (e.g. auditing server 206 and/or auditing database 208 of FIG. 2, auditing server/database 306 of FIG. 3, etc.). As shown, the method 900 begins by assembling a predetermined number of compliance officers, per operation 902. It should be noted that a HSM may enforce a rule where n out of m officers are required to decrypt the messages.

When assembled, the compliance officers initiate access to the auditing private key (e.g. AuditingPrivateKey, etc.), as indicated in operation 904. For example, such compliance officers may use universal serial bus (USB) keys and/or smart cards to authenticate to the HSM, and open the auditing private key (e.g. AuditingPrivateKey, etc.). Further, the compliance officers may choose a log record to which access is desired, per operation 906, which then initiates a series of operations for accessing the same.

Specifically, in operation 908, a compliance client (e.g. compliance client 216 of FIG. 2, etc.) may be used to decrypt the encrypted auditing public key associated with the message M (e.g. $E_{AuditingPublicKey}(M)$, etc.), using the auditing private key (e.g. AuditingPrivateKey, etc.) to obtain access to the message. Next, in operation 910, The compliance client may be used to identify the first recipient in the message, and thereby locate the encrypted DAR private key [e.g. $E_{AuditingPublicKey}(DARPrivateKey)$, etc.] for such recipient in a database (e.g. auditing database 208 of FIG. 2, etc.). As mentioned earlier, such encrypted DAR private key had been registered earlier during a user peer initialization process (e.g. method 400 of FIG. 4, etc.).

Next, the compliance client decrypts the encrypted DAR private key [e.g. $E_{AuditingPublicKey}(DARPrivateKey)$, etc.] to obtain the DAR private key (e.g. DARPrivateKey, etc.). See operation 912. Further, as indicated in operation 914, the compliance client uses the DAR private key (e.g. DARPrivateKey, etc.) with the ephemeral public key from the message to obtain the symmetric key. Still yet, the compliance client inputs the symmetric key into the broadcast protocol to decrypt the message and verify message integrity, as indicated in operation 916.

As indicated in decision 918, it is determined whether one or more of the previous operations 906-916 failed, in which case, the compliance client raises a red flag in operation 906, and chooses a next recipient and associated DAR private key (in operation 921) in order to attempt to decrypt the message starting again at operation 912. On the other hand, if there is success per decision 918, the compliance officers may gain access to the message (e.g. by viewing outputted plaintext, etc.). See operation 922.

Thereafter, the method 900 may continue for any additional logged encrypted messages per decision 924. Again, because the auditing server does not have access to the auditing private key (e.g. AuditingPrivateKey, etc.), the auditing server cannot decrypt the messages.

It should be noted that various techniques may be attempted by a malicious sender to hide messages from the auditing server, in an attempt to circumvent the supported security protocols. For example, a user peer may register an invalid encrypted DAR private key [e.g. $E_{AuditingPublicKey}$ (DARPrivateKey), etc.] with the hope that the compliance client will not be able to decrypt the messages the peer receives. However, because the sender sends the encrypted DAR private key, the compliance client would be able to use the sender's encrypted DAR private key to decrypt the message. While this approach does not necessarily work when the sender and receiver are both malicious, in such case, the malicious users would simply be able to communicate outside of this system to avoid being audited anyway.

In the context of another malicious technique, if an attacker prevents the auditing server from receiving the message (e.g. by cutting a wire), the routing server would not receive an acknowledgement from the auditing server and would thus not forward the message to the recipients. As described earlier, the messages are additionally encrypted by the auditing server, which aids in preventing a situation when an attacker compromises a user device and retrieves a user's DAR private key (e.g. DARPrivateKey, etc.). If the messages are not encrypted in such manner, an attacker who can access the auditing log would also be able to decrypt all messages ever sent to such user.

By this design, a peer-to-peer protocol is afforded that provides future secrecy to protect communication over hostile networks. Further, the auditing server never has access to message plaintext, so compromising the auditing server does not result in immediately compromised messages. Still yet, the sending peer device cannot send one message to the recipient and a different message to the auditing server. In fact, if a valid message has been received on another peer device, it is logged.

Figure 10:
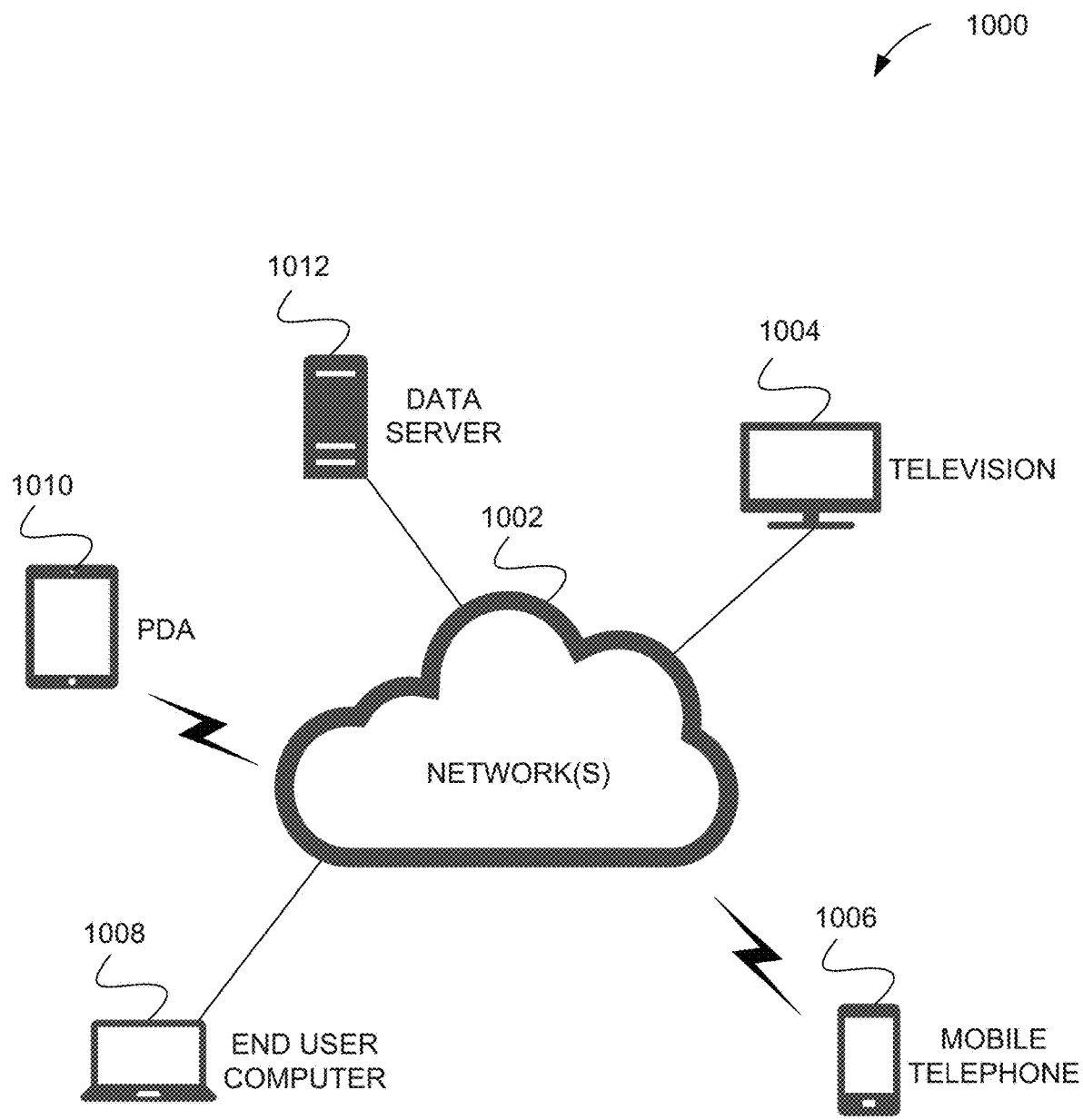
FIG. 10 illustrates a network architecture, in accordance with one embodiment.

FIG. 10 illustrates a network architecture 1000 in which one or more of the aforementioned features may be implemented, in accordance with one embodiment. As shown, at least one network 1002 is provided. In the context of the present network architecture 1000, the network 1002 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1002 may be provided.

Coupled to the network 1002 is a plurality of devices. For example, a server computer 1012 and an end user computer 1008 may be coupled to the network 1002 for communication purposes. Such end user computer 1008 may include a desktop computer, lap-top computer, and/or any other type of logic. Still yet, various other devices may be coupled to the network 1002 including a personal digital assistant (PDA) device 1010, a mobile phone device 1006, a television 1004, etc.

Figure 11:
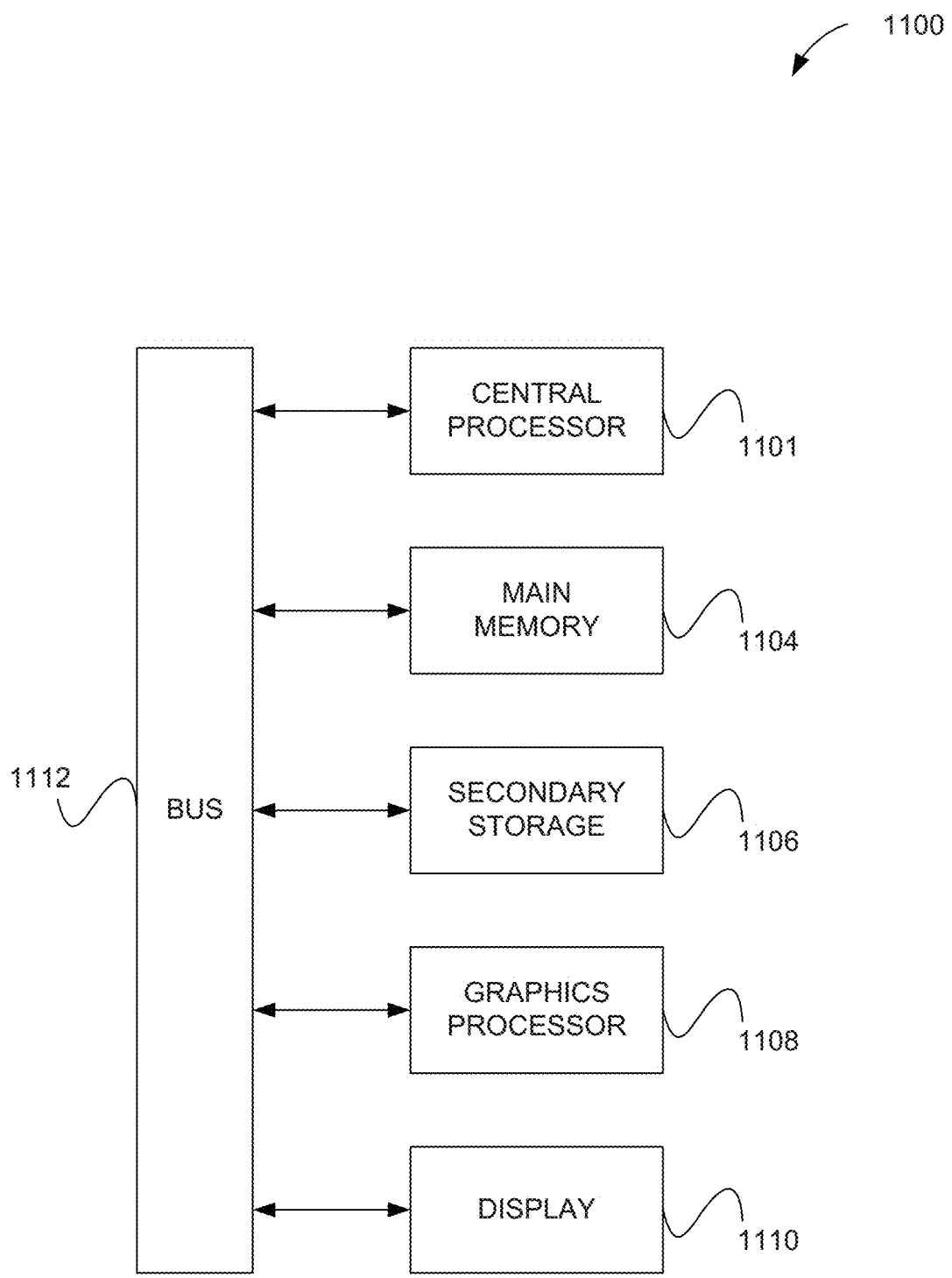
FIG. 11 illustrates an exemplary system, in accordance with one embodiment.

FIG. 11 illustrates an exemplary system 1100, in accordance with one embodiment. As an option, the system 1100 may be implemented in the context of any of the devices of the network architecture 1000 of FIG. 10. However, it is to be appreciated that the system 1100 may be implemented in any desired environment.

As shown, a system 1100 is provided including at least one central processor 1102 which is connected to a bus 1112. The system 1100 also includes main memory 1104 [e.g., hard disk drive, solid state drive, random access memory (RAM), etc.]. The system 1100 also includes a graphics processor 1108 and a display 1110.

The system 1100 may also include a secondary storage 1106. The secondary storage 1106 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1104, the secondary storage 1106, and/or any other memory, for that matter. Such computer programs, when executed, enable the system 1100 to perform various functions (as set forth above, for example). Memory 1104, secondary storage 1106 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product comprising computer executable instructions stored on a non-transitory computer readable medium that when executed by a processor instruct the processor to:
   initialize a first peer device with an auditing server, by:
      receiving, by the auditing server from the first peer device, a first data at rest (DAR) key pair that includes a first DAR public key and a first encrypted DAR private key, the first encrypted DAR private key formed by the first peer device encrypting a first DAR private key using an auditing public key provided by the auditing server, and
      storing, by the auditing server, the first encrypted DAR private key in association with an identifier of the first peer device;
   initialize a second peer device with the auditing server, by:
      receiving, by the auditing server from the second peer device, a second data at rest (DAR) key pair that includes a second DAR public key and a second encrypted DAR private key, the second encrypted DAR private key formed by the second peer device encrypting a second DAR private key using the auditing public key provided by the auditing server,
      storing, by the auditing server, the second encrypted DAR private key in association with an identifier of the second peer device;
   receive, by the auditing server from a routing server, a copy of a peer-to-peer broadcast message sent by the first peer device for transmission to the second peer device, the peer-to-peer broadcast message generated by the first peer device using the second DAR public key and wrapped using a peer-to-peer security protocol;

validate, by the auditing server, the peer-to-peer broadcast message by:
    determining that the peer-to-peer broadcast message contains a message copy for the auditing server, and
    verifying a digital signature on the peer-to-peer broadcast message and that the second DAR public key is stored for the second peer device that is the intended recipient of the peer-to-peer broadcast message;
responsive to the auditing server validating the peer-to-peer broadcast message:
    provide, by the auditing server, an indication of success to the routing server for prompting the routing server to transmit the peer-to-peer broadcast message to the second peer device, and
    store, in a database associated with the auditing server, the copy of the peer-to-peer broadcast message and associated metadata indicating the first peer device as a sender of the peer-to-peer broadcast message, the second peer device as a receiver of the peer-to-peer broadcast message, and a timestamp;
wherein the copy of the peer-to-peer broadcast message stored in the database is only accessible to one or more compliance offers having knowledge of an auditing private key, using the second encrypted DAR private key stored by the auditing server in association with the identifier of the second peer device;
wherein the first peer device, the second peer device, the auditing server, and the routing server communicate via a network.

2. The computer program product of claim 1, wherein the computer program product is further configured such that the auditing private key stored in a hardware security module.

3. An apparatus, comprising:
an auditing server configured to:
initialize a first peer device with the auditing server, by:
    receiving, by the auditing server from the first peer device, a first data at rest (DAR) key pair that includes a first DAR public key and a first encrypted DAR private key, the first encrypted DAR private key formed by the first peer device encrypting a first DAR private key using an auditing public key provided by the auditing server, and
    storing, by the auditing server, the first encrypted DAR private key in association with an identifier of the first peer device;
initialize a second peer device with the auditing server, by:
    receiving, by the auditing server from the second peer device, a second data at rest (DAR) key pair that includes a second DAR public key and a second encrypted DAR private key, the second encrypted DAR private key formed by the second peer device encrypting a second DAR private key using the auditing public key provided by the auditing server,
    storing, by the auditing server, the second encrypted DAR private key in association with an identifier of the second peer device;
receive, by the auditing server from a routing server, a copy of a peer-to-peer broadcast message sent by the first peer device for transmission to the second peer device, the peer-to-peer broadcast message generated by the first peer device using the second DAR public key and wrapped using a peer-to-peer security protocol;
validate, by the auditing server, the peer-to-peer broadcast message by:
    determining that the peer-to-peer broadcast message contains a message copy for the auditing server, and
    verifying a digital signature on the peer-to-peer broadcast message and that the second DAR public key is stored for the second peer device that is the intended recipient of the peer-to-peer broadcast message;
responsive to the auditing server validating the peer-to-peer broadcast message:
    provide, by the auditing server, an indication of success to the routing server for prompting the routing server to transmit the peer-to-peer broadcast message to the second peer device, and
    store, in a database associated with the auditing server, the copy of the peer-to-peer broadcast message and associated metadata indicating the first peer device as a sender of the peer-to-peer broadcast message, the second peer device as a receiver of the peer-to-peer broadcast message, and a timestamp;
wherein the copy of the peer-to-peer broadcast message stored in the database is only accessible to one or more compliance offers having knowledge of an auditing private key, using the second encrypted DAR private key stored by the auditing server in association with the identifier of the second peer device;
wherein the first peer device, the second peer device, the auditing server, and the routing server communicate via a network.

4. A method, comprising:
initializing a first peer device with an auditing server, by:
    receiving, by the auditing server from the first peer device, a first data at rest (DAR) key pair that includes a first DAR public key and a first encrypted DAR private key, the first encrypted DAR private key formed by the first peer device encrypting a first DAR private key using an auditing public key provided by the auditing server, and
    storing, by the auditing server, the first encrypted DAR private key in association with an identifier of the first peer device;
initializing a second peer device with the auditing server, by:
    receiving, by the auditing server from the second peer device, a second data at rest (DAR) key pair that includes a second DAR public key and a second encrypted DAR private key, the second encrypted DAR private key formed by the second peer device encrypting a second DAR private key using the auditing public key provided by the auditing server,
    storing, by the auditing server, the second encrypted DAR private key in association with an identifier of the second peer device;
receiving, by the auditing server from a routing server, a copy of a peer-to-peer broadcast message sent by the first peer device for transmission to the second peer device, the peer-to-peer broadcast message generated by the first peer device using the second DAR public key and wrapped using a peer-to-peer security protocol;
validating, by the auditing server, the peer-to-peer broadcast message by:
    determining that the peer-to-peer broadcast message contains a message copy for the auditing server, and
    verifying a digital signature on the peer-to-peer broadcast message and that the second DAR public key is stored for the second peer device that is the intended recipient of the peer-to-peer broadcast message;
responsive to the auditing server validating the peer-to-peer broadcast message:
    providing, by the auditing server, an indication of success to the routing server for prompting the routing server to transmit the peer-to-peer broadcast message to the second peer device, and storing, in a database associated with the auditing server, the copy of the peer-to-peer broadcast message and associated metadata indicating the first peer device as a sender of the peer-to-peer broadcast message, the second peer device as a receiver of the peer-to-peer broadcast message, and a timestamp;

wherein the copy of the peer-to-peer broadcast message stored in the database is only accessible to one or more compliance offers having knowledge of an auditing private key, using the second encrypted DAR private key stored by the auditing server in association with the identifier of the second peer device;

wherein the first peer device, the second peer device, the auditing server, and the routing server communicate via a network.

\* \* \* \* \*